C. H. Van Orstrand,
Vegetable Cutter.

No. 93,263. Patented Aug. 3, 1869.

Witnesses:
Francis S. Long
[signature]

C. H. Van Orstrand

United States Patent Office.

C. H. VAN ORSTRAND, OF NEW YORK, N. Y.

Letters Patent No. 93,253, dated August 3, 1869.

IMPROVEMENT IN MACHINE FOR CUTTING AND SLICING VEGETABLES.

The Schedule referred to in these Letters Patent and making part of the same.

*To all whom it may concern:*

Be it known that I, C. H. VAN ORSTRAND, of the city, county, and State of New York, have invented a certain new and useful Improvement in Machines for Cutting and Slicing Vegetables; and I do hereby declare that the following is a full and exact description of the same, reference being had to the accompanying drawings, and to the letters of reference marked thereon, in which—

Figure 1:
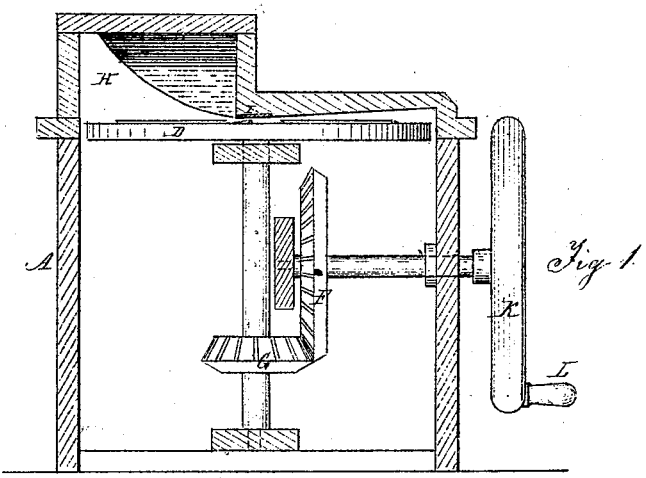
Figure 2:
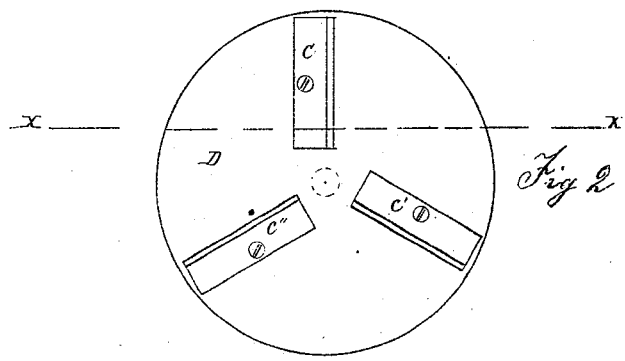
Figure 3:

Figure 1 is a vertical cut section;

Figure 2, a plan view of the cutter plate;

Figure 3, a cut section of the same, taken at the line x x, fig 2; and

Figure 4:
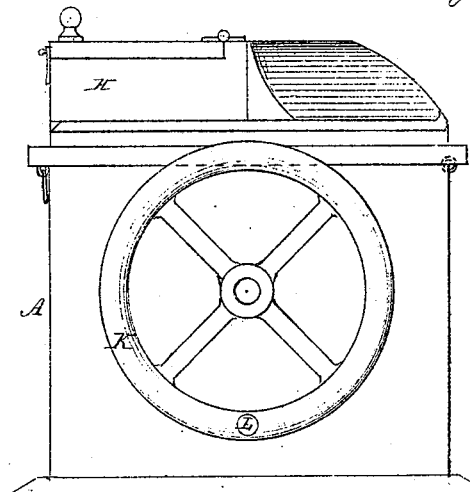

Figure 4, an end view of the machine.

The object and purpose of my invention are to provide a machine wherein such vegetables as are required to be cut or sliced for either table use or for culinary purposes, can be readily, quickly, and cheaply cut or sliced.

Many vegetables require to be cut or sliced into thin particles before they can be used for either table or culinary use; among which may be mentioned raw cabbage and raw tomatoes for table use, and raw potatoes and turnips (and others) for culinary use. The advantage of having them made into slices is well known and appreciated.

A is the case of the machine, on the top part of which is placed the hopper H, through which the articles to be cut and sliced pass to be operated upon by the cutters.

D is the cutter-plate, provided with the cutting-knives C C' C'', and revolved with the gear-wheels F and G, by means of the handle L on the fly-wheel K.

I is a cutting-plate, so arranged, in relation to the hopper H and the cutter-plate D, as to hold the article to be sliced or cut when the cutter-plate D is put in motion, and which also serves to give, a "shearing" cut to the cutting-knives C C' C'' when passing beneath it.

This apparatus will cut and slice vegetables for table use very rapidly and effectually; at the same time being cheaply constructed and readily operated by any person who can work and feed it.

What I claim as my invention, and desire to secure by Letters Patent, is—

The combination of the cutter-plate D, and the series of cutters C C' C'', with the driving-gears F and G, the hopper H, and the cutting-plate I, all arranged and located as and for the purposes set forth.

C. H. VAN ORSTRAND.

Witnesses:
 FRANCIS S. LOW,
 J. DE LA FIGONIER.